United States Patent
Tonisson

(10) Patent No.: US 7,313,248 B2
(45) Date of Patent: Dec. 25, 2007

(54) STEGANOGRAPHIC IMAGE ENCODING

(75) Inventor: Alan Valev Tonisson, Baulkham Hills (AU)

(73) Assignee: Canon Kabushiki Kaisha, Tokyo (JP)

(*) Notice: Subject to any disclaimer, the term of this patent is extended or adjusted under 35 U.S.C. 154(b) by 822 days.

(21) Appl. No.: 10/426,842

(22) Filed: May 1, 2003

(65) Prior Publication Data

US 2004/0017926 A1   Jan. 29, 2004

(30) Foreign Application Priority Data

May 1, 2002   (AU) ................................. PS2068

(51) Int. Cl.
*G06K 9/00*   (2006.01)
(52) U.S. Cl. .................. 382/100; 382/168; 713/176
(58) Field of Classification Search ............... 382/100, 382/106, 112, 140, 162–167, 168, 194, 199, 382/232, 233–239, 274, 291, 305, 317, 242; 707/101; 713/176, 162; 715/719, 720
See application file for complete search history.

(56) References Cited

U.S. PATENT DOCUMENTS

| 5,659,726 | A  | * | 8/1997  | Sandford et al. | 707/101 |
| 5,898,799 | A  | * | 4/1999  | Murayama | 382/242 |
| 6,005,936 | A  | * | 12/1999 | Shimizu et al. | 713/176 |
| 6,628,801 | B2 | * | 9/2003  | Powell et al. | 382/100 |
| 6,879,701 | B1 | * | 4/2005  | Rhoads | 382/100 |
| 6,957,387 | B2 | * | 10/2005 | Barbieri | 715/719 |
| 7,089,420 | B1 | * | 8/2006  | Durst et al. | 713/176 |
| 7,120,274 | B2 | * | 10/2006 | Kacker et al. | 382/100 |

* cited by examiner

*Primary Examiner*—Seyed Azarian
(74) *Attorney, Agent, or Firm*—Fitzpatrick, Cella, Harper & Scinto

(57) ABSTRACT

A steganographic image encoding method (100) is disclosed. The method (100) defines a candidate set of incoherent pixel groups in a digital image, each pixel group comprising at least two pixels. A subset of the candidate set of pixel groups is selected using a predefined selection criterion and an integer colour value is assigned to each of a plurality of colours. The information is embedded in the image by modifying colour values of pixels of the selected subset of pixel groups such that the information is embedded in accordance with the order of the integer colour values corresponding to the colour values after modification.

45 Claims, 8 Drawing Sheets

STEGANOGRAPHIC IMAGE ENCODING

CROSS-REFERENCE TO RELATED PATENT APPLICATIONS

This application claims the right of priority under 35 U.S.C. § 119 based on Australian Patent Application No. PS2068, filed May 1, 2002, which is incorporated by reference herein in its entirety as if fully set forth herein.

TECHNICAL FIELD OF THE INVENTION

The present invention relates generally to steganographic embedding of data in digital images and, in particular, to the authentication of digital images using steganographically embedded data.

BACKGROUND

Several device types are now available for recording images on digital media, including digital still cameras, digital video cameras, and even mobile phones and Pocket Data Assistants (PDAs). Digital cameras in particular are becoming increasingly popular because they are more convenient to use than film cameras, and the price of digital cameras continues to drop, while the quality of images produced by digital cameras is now approaching that of film.

One feature of digital data is the ease with which such data can be manipulated or modified. This creates a difficulty that it is easy to modify a captured image to create a false representation of the original scene or event. There is a desire to guard against such modification of images, and particularly in fields such as forensics, insurance, and legal or law enforcement, where it is essential to prove the authenticity of images.

Conventional approaches to proving authenticity of digital data have involved the use of digital signatures based on cryptography. A digital signature signed with a private key is typically added to the image data so that the data can be authenticated by verifying the signature using the associated public key. This has the drawback that the authentication data may easily be separated from the image data. It is therefore desirable to have a means of authenticating image data without referring to any authentication data that may be separated from the image data.

Another approach to proving the authenticity of an image is to embed a digital signature in the image through the use of steganography. Steganography is the art and science of hiding information such that the presence of such information cannot be detected. The digital signature is typically based on a hash of the raw image data encrypted with a private key.

A known way of embedding the digital signature in the image is to embed the digital signature in a removable watermark. A watermark image is embedded in the image when the image is captured and may be embedded by the image capture device. Removable watermarks are embedded into an image by using a reversible operation to modify one or more colour components of the pixel data of the image. One known method is to add the watermark image to the image data using modulo $2^n$ addition, where n is the number of bits used to store the relevant colour component.

To authenticate the image, the watermark pattern used for creating the watermark image has to be known. The watermark positions are detected using a correlation of the known watermark pattern with the watermarked image. The original watermark image is then reproduced and subtracted to recover the original image. Finally the signature can be verified using the public key of the source. This is typically done by re-calculating the hash of the image and comparing it to the result of decrypting the stored signature with the public key. If the values are the same, the image is authentic.

A problem with the above-mentioned solution is that the modulo $2^n$ addition of the watermark is likely to cause some large component values to wrap around, resulting in a small value in the watermarked image. This may be highly visible. For example, adding the watermark may make some regions that are lightly coloured in the original image become very dark in the watermarked image, resulting in highly visible changes to parts of the image.

Another problem with this solution is that because the process of detecting the watermark uses correlation, the detection process is not always reliable, as it is affected by the characteristics of the image itself. The watermark must be detected exactly to enable it to be removed. A known solution to this problem is to increase the amplitude of the watermark until the watermark becomes reliably detectable. This typically involves repeated insertion and detection operations until a suitable amplitude value is found. Unfortunately, this makes the process of inserting the authentication data inefficient.

Another approach to image authentication is to embed a fragile watermark in the image that is destroyed by modification of the image data. If the watermark can be detected, the image must be authentic. This approach is not as secure as one using digital signatures.

Other approaches to steganographically embedding information in images are based on modification of compressed images. Images are often stored in a compressed form, and the compression algorithms typically used are "lossy", i.e. the original image cannot be exactly recovered from the compressed form. These approaches have the disadvantage that the quality of the image is reduced by the compression process. There is a demand amongst professional photographers for high quality images, and these are the kinds of images for which authentication is likely to be required. Thus there is a need for reliable authentication of uncompressed images.

SUMMARY OF THE INVENTION

It is an object of the present invention to substantially overcome, or at least ameliorate, one or more disadvantages of existing arrangements.

According to a first aspect of the invention, there is provided a method of embedding information in a digital image, said method comprising the steps of:

a) defining a candidate set of incoherent pixel groups in said image, each pixel group comprising at least two pixels;

b) selecting a subset of said candidate set of pixel groups using a predefined selection criterion;

c) assigning an integer colour value to each of a plurality of colours;

d) embedding said information in said image by modifying colour values of pixels of said selected subset of pixel groups such that said information is embedded in accordance with the order of said integer colour values corresponding to said colour values after modification.

According to another aspect of the invention, there is provided a method of extracting information embedded in a digital image, said method comprising the steps of:

a) defining a candidate set of incoherent pixel groups in said image, each pixel group comprising at least two pixels;

b) selecting a subset of said candidate set of pixel groups using a predefined selection criterion; and c) assigning an integer colour value to each of a plurality of colours; and d) extracting said information from said image by assessing the colour values of pixels of said selected subset of pixel groups such that said information is extracted in accordance with the order of said integer colour values.

According to still another aspect of the invention, there is provided a method of embedding a digital signature in a digital image, said method comprising the steps of:

a) defining a candidate set of incoherent pixel groups in said image, each pixel group comprising at least two pixels;

b) selecting a subset of said candidate set of pixel groups using a predefined selection criterion, wherein pixel groups having at least two pixels with non-distinct colour values are excluded from said selection;

c) normalising colour values of pixels of the selected pixel groups;

d) calculating said digital signature;

e) assigning an integer colour value to each of a plurality of colours; and f) embedding said digital signature in said image by interchanging colour values of pixels of said selected subset of pixel groups such that said digital signature is embedded in accordance with the order of said integer colour values corresponding to said colour values after interchanging.

According to still another aspect of the invention, there is provided a method of authenticating a digital image, said method comprising the steps of:

a) establishing a candidate set of incoherent pixel groups in said image, each pixel group comprising at least two pixels;

b) selecting a subset of said candidate set of pixel groups using a predefined selection criterion, wherein pixel groups having at least two pixels with non-distinct colour values are excluded from said selection;

c) assigning an integer colour value to each of a plurality of colours;

d) extracting said digital signature from said image by assessing the colour values of pixels of said selected subset of pixel groups such that said digital signature is extracted in accordance with the order of said integer colour values;

e) calculating a first hash value from said digital signature;

f) normalising colour values of pixels of the selected pixel groups;

g) calculating a second hash value from the normalised image; and h) authenticating said digital image by comparing said first and second hash values.

According to still another aspect of the invention, there is provided a method of embedding a digital signature in a digital image, said method comprising the steps of:

a) normalising colour values of pixels of said digital image;

b) calculating said digital signature from said normalised image; and c) embedding said digital signature into said normalised image.

According to still another aspect of the invention, there is provided a method of authenticating a digital image, said method comprising the steps of:

a) extracting an embedded digital signature from said digital image;

b) calculating a first hash value from said digital signature;

c) normalising colour values of pixels of said image;

d) calculating a second hash value from the normalised image; and e) authenticating said digital image by comparing said first and second hash values.

According to still another aspect of the invention, there is provided an apparatus for embedding information in a digital image, said apparatus comprising:

means for defining a candidate set of incoherent pixel groups in said image, each pixel group comprising at least two pixels;

means for selecting a subset of said candidate set of pixel groups using a predefined selection criterion; and means for assigning an integer colour value to each of a plurality of colours; and means for embedding said information in said image by modifying colour values of pixels of said selected subset of pixel groups such that said information is embedded in accordance with the order of said integer colour values corresponding to said colour values after modification.

According to still another aspect of the invention, there is provided an apparatus for extracting information embedded in a digital image, said apparatus comprising:

means for defining a candidate set of incoherent pixel groups in said image, each pixel group comprising at least two pixels;

means for selecting a subset of said candidate set of pixel groups using a predefined selection criterion;

means for assigning an integer colour value to each of a plurality of colours; and means for extracting said information from said image by assessing the colour values of pixels of said selected subset of pixel groups such that said information is extracted in accordance with the order of said integer colour values.

According to still another aspect of the invention, there is provided an apparatus for embedding a digital signature in a digital image, said apparatus comprising:

means for defining a candidate set of incoherent pixel groups in said image, each pixel group comprising at least two pixels;

means for selecting a subset of said candidate set of pixel groups using a predefined selection criterion, wherein pixel groups having at least two pixels with non-distinct colour values are excluded from said selection;

means for normalising colour values of pixels of the selected pixel groups;

means for calculating said digital signature;

means for assigning an integer colour value to each of a plurality of colours; and means for embedding said digital signature in said image by interchanging colour values of pixels of said selected subset of pixel groups such that said digital signature is embedded in accordance with the order of said integer colour values corresponding to said colour values after interchanging.

According to still another aspect of the invention, there is provided an apparatus for authenticating a digital image, said apparatus comprising:

means for establishing a candidate set of incoherent pixel groups in said image, each pixel group comprising at least two pixels;

means for selecting a subset of said candidate set of pixel groups using a predefined selection criterion, wherein pixel groups having at least two pixels with non-distinct colour values are excluded from said selection;

means for assigning an integer colour value to each of a plurality of colours;

means for extracting said digital signature from said image by assessing the colour values of pixels of said selected subset of pixel groups such that said digital signature is extracted in accordance with the order of said integer colour values;

means for calculating a first hash value from said digital signature;

means for normalising colour values of pixels of the selected pixel groups;

means for calculating a second hash value from the normalised image; and means for authenticating said digital image by comparing said first and second hash values.

According to still another aspect of the invention, there is provided an apparatus for embedding a digital signature in a digital image, said apparatus comprising:

means for normalising colour values of pixels of said digital image;

means for calculating said digital signature from said normalised image; and means for embedding said digital signature into said normalised image.

According to still another aspect of the invention, there is provided an apparatus for authenticating a digital image, said apparatus comprising;

means for extracting an embedded digital signature from said digital image;

means for calculating a first hash value from said digital signature;

means for normalising colour values of pixels of said image;

means for calculating a second hash value from the normalised image; and means for authenticating said digital image by comparing said first and second hash values.

According to still another aspect of the invention, there is provided a program stored in a memory medium for embedding information in a digital image, said program comprising:

code for defining a candidate set of incoherent pixel groups in said image, each pixel group comprising at least two pixels;

code for selecting a subset of said candidate set of pixel groups using a predefined selection criterion; and code for assigning an integer colour value to each of a plurality of colours; and code for embedding said information in said image by modifying colour values of pixels of said selected subset of pixel groups such that said information is embedded in accordance with the order of said integer colour values corresponding to said colour values after modification.

According to still another aspect of the invention, there is provided a program stored in a memory medium for extracting information embedded in a digital image, said program comprising:

code for defining a candidate set of incoherent pixel groups in said image, each pixel group comprising at least two pixels;

code for selecting a subset of said candidate set of pixel groups using a predefined selection criterion; and code for assigning an integer colour value to each of a plurality of colours; and code for extracting said information from said image by assessing the colour values of pixels of said selected subset of pixel groups such that said information is extracted in accordance with the order of said integer colour values.

According to still another aspect of the invention, there is provided a program stored in a memory medium for embedding a digital Signature in a digital image, said program comprising:

code for defining a candidate set of incoherent pixel groups in said image, each pixel group comprising at least two pixels;

code for selecting a subset of said candidate set of pixel groups using a predefined selection criterion, wherein pixel groups having at least two pixels with non-distinct colour values are excluded from said selection;

code for normalising colour values of pixels of the selected pixel groups;

code for calculating said digital signature; and code for assigning an integer colour value to each of a plurality of colours; and code for embedding said digital signature in said image by interchanging colour values of pixels of said selected subset of pixel groups such that said digital signature is embedded in accordance with the order of said integer colour values corresponding to said colour values after interchanging.

According to still another aspect of the invention, there is provided a program stored in a memory medium for authenticating a digital image, said program comprising:

code for establishing a candidate set of incoherent pixel groups in said image, each pixel group comprising at least two pixels;

code for selecting a subset of said candidate set of pixel groups using a predefined selection criterion, wherein pixel groups having at least two pixels with non-distinct colour values are excluded from said selection;

code for assigning an integer colour value to each of a plurality of colours;

code for extracting said digital signature from said image by assessing the colour values of pixels of said selected subset of pixel groups such that said digital signature is extracted in accordance with the order of said integer colour values;

code for calculating a first hash value from said digital signature;

code for normalising colour values of pixels of the selected pixel groups;

code for calculating a second hash value from the normalised image; and code for authenticating said digital image by comparing said first and second hash values.

According to still another aspect of the invention there is provided a program stored in a memory medium for embedding a digital signature in a digital image, said program comprising:

code for normalising colour values of pixels of said digital image;

code for calculating said digital signature from said normalised image; and code for embedding said digital signature into said normalised image.

According to still another aspect of the invention, there is provided a program stored in a memory medium for authenticating a digital image, said program comprising:

code for extracting an embedded digital signature from said digital image;

code for calculating a first hash value from said digital signature;

code for normalising colour values of pixels of said image;

code for calculating a second hash value from the normalised image; and code for authenticating said digital image by comparing said first and second hash values.

Other aspects of the invention are also disclosed.

BRIEF DESCRIPTION OF THE DRAWINGS

One or more embodiments of the present invention will now be described with reference to the drawings, in which.

DETAILED DESCRIPTION

Figure 1:
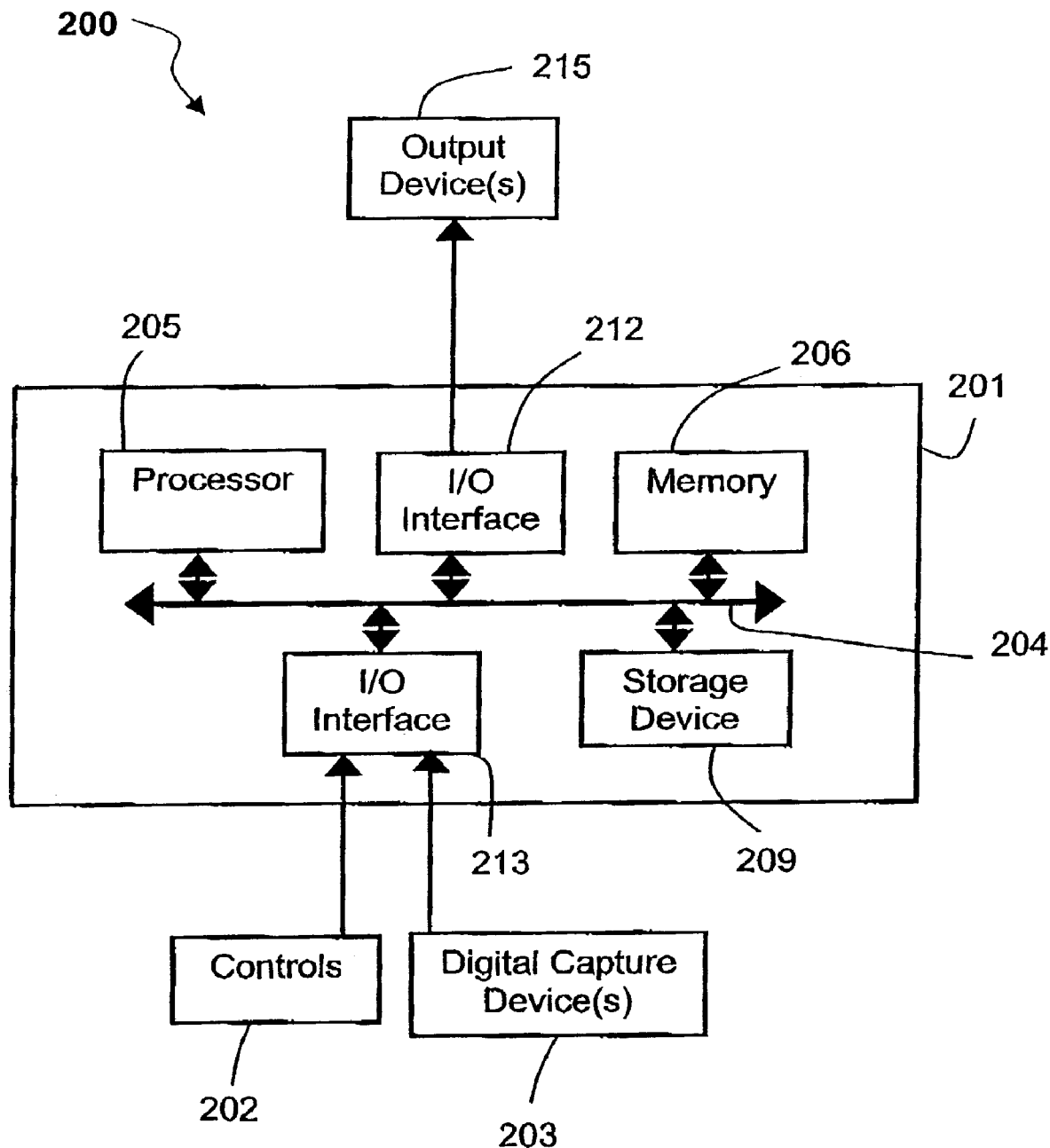
FIG. 1 shows a schematic block diagram of a system for steganographically embedding and extracting of information in a digital image.

Where reference is made in any one or more of the accompanying drawings to steps and/or features, which have the same reference numerals, those steps and/or features have for the purposes of this description the same function(s) or operation(s), unless the contrary intention appears.

Steganographically embedding and extracting of information in a digital image may be practiced using a system 200, a schematic block diagram of which is shown in FIG. 1. The system 200 may, for example, be a general-purpose computer, a digital camera, a video camera or a scanner. The system 200 comprises a computer module 201, output device(s) 215 and input devices such as controls 202 and a digital capture device 203. The digital capture device 203 may be an image sensor, such a two-dimensional CCD array. The computer module 201 typically includes at least one processor unit 205, a memory unit 206, for example formed from semiconductor random access memory (RAM) and read only memory (ROM), input/output (I/O) interface(s) and a mass storage device 209, such as a magnetic hard disk or a magneto-optical disk. The components 205 to 213 of the computer module 201, typically communicate via an interconnected bus 204 and in a manner which results in a conventional mode of operation of the computer system 200 known to those in the relevant art.

In the case where the system 200 is a general-purpose computer, the output device 215 generally includes a display device. A printer may also be provided. The controls 202 include a keyboard and a mouse. The storage device 209 typically includes a hard disk drive, a floppy disk drive and a CD-ROM drive.

The steganographic embedding and extracting of information in a digital image is typically controlled by an application program, which is resident on the storage device 209. The application program is read and controlled in its execution by the processor 205. Intermediate storage of the program may be accomplished using the semiconductor memory 206, possibly in concert with the storage device 209. In some instances, the application program may be supplied to the user encoded on a CD-ROM or floppy disk and read via a CD-ROM drive or floppy disk drive 211, or alternatively may be read by the user from a network (not illustrated).

Figure 2:
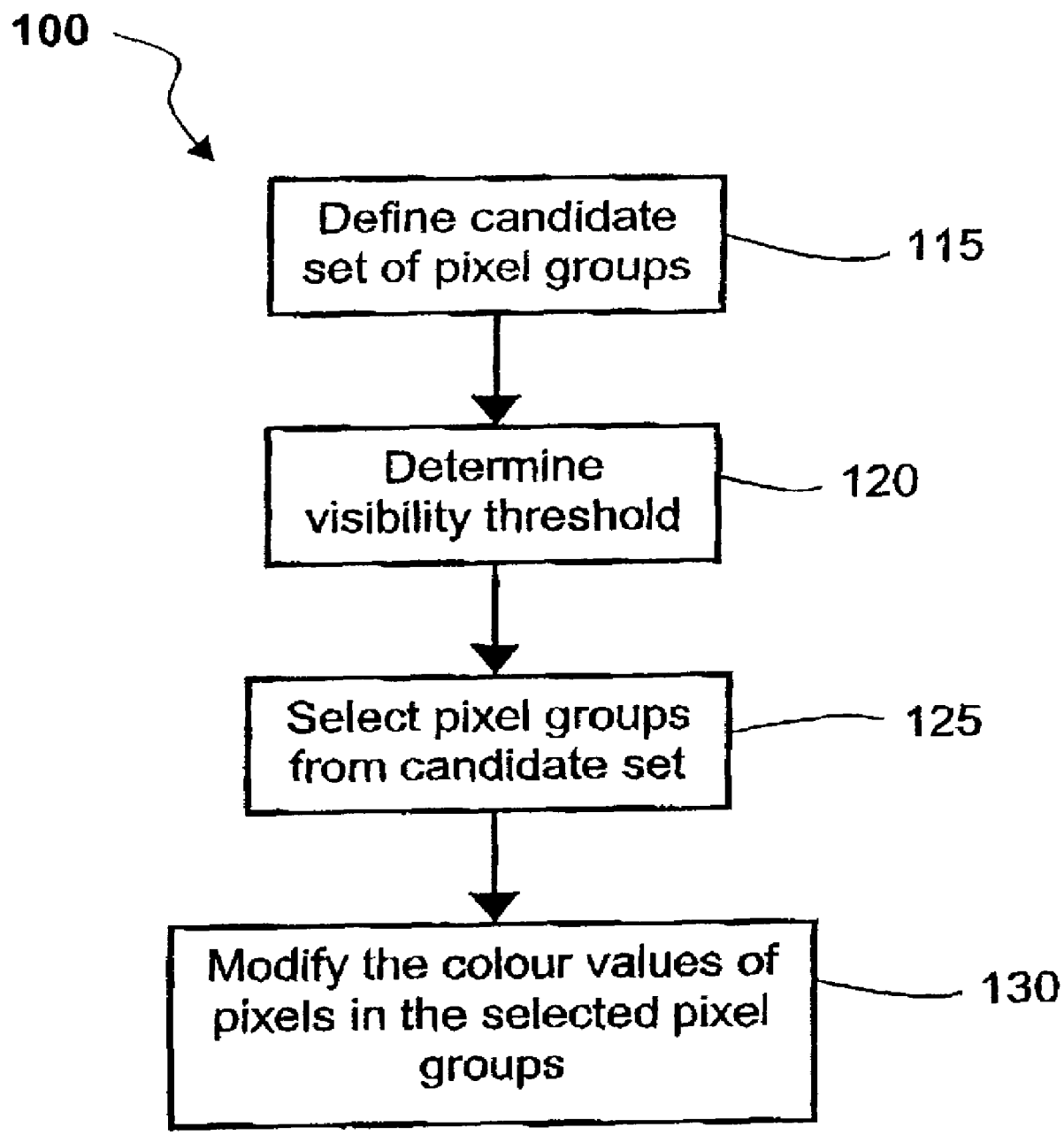
FIG. 2 shows a flow diagram of a method of steganographically embedding information in a digital image.

FIG. 2 shows a flow diagram of a method 100 of steganographically embedding information in a digital image, wherein the steps of method 100 may be implemented as software, such as the application program executing within the system 200 shown in FIG. 1. The digital image may be obtained by the system 200 using the digital capture device(s) 203 or the image may be stored previously on the storage device 209. The digital image consists of pixels, and each pixel consists of one or more colour components, each of which is stored as a binary number. The colour components of a pixel define the colour of the pixel in some predefined colour space.

The information to be steganographically embedded into the image may be any data representable as a bit string. For example, the information "B2" may be represented as bit string:

$$01000010\ 00110010_2 \tag{1}$$

using the conventional 8-bit ASCII code, and has a length of 16 bits.

In broad terms, the method 100 of steganographically embedding information in the digital image is operative to select a number of pixel groups from a candidate set of pixel groups, and then embedding the information by selectively modifying the colour values of pixels of the selected pixel groups Accordingly, the method 100 starts in step 115 where the processor 205 defines the candidate set of pixel groups in the digital image. The pixel groups are defined to be incoherent and each pixel group includes at least two image pixels. The definition of pixel groups must also be reproducible at a decoder.

In order to maximise the number of pixel groups available to select from for embedding the information, the defined candidate pixel groups should preferably cover as many image pixels as possible. Accordingly, the ideal definition of pixel groups is one that includes all the image pixels in pixel groups.

In the preferred implementation, the pixels of each candidate pixel group are spatially close to each other. An advantage of defining the candidate pixel groups such that their pixels are spatially close to each other is that, in typical photographic images, pixels that are spatially close to each other are more likely to have similar colour values. As would become clear in what follows, pixels having similar colour values require less modification in order to embed the information, which in turn makes such modification less visible. In a specific implementation, the candidate pixel groups consist of all vertically or horizontally adjacent pairs of pixels.

To avoid any visible artefacts in the digital image wherein the colour values have been modified to embed the information, the incoherent pixel groups defined in step 115 are preferably defined in a pseudo random manner. In the preferred implementation a predetermined repeating random pattern of tiles is used, such as the pattern illustrated in FIG.

3. Tiles in the repeating pattern that extend beyond the edge 302 of the image, such as tiles 303 and 304, are discarded.

Figure 4:
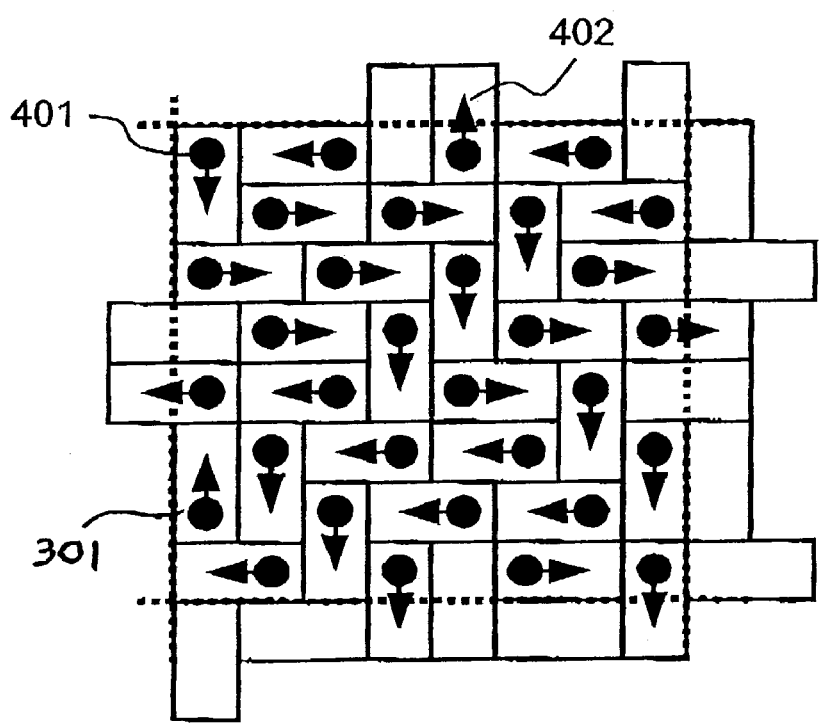
FIG. 4 illustrates a repeating pattern used to define the candidate pixel groups illustrated in FIG. 3.

The overall pattern is made up from a repeating pattern 301 of tiles. FIG. 4 shows one such repeating pattern 301 in more detail. Each pixel in the rectangular array within the pattern 301 may be assigned a parity based on the number of the row and column it appears in. If a pixel is in an even row and even column or in an odd row and an odd column, then it has even parity, otherwise it has odd parity. In FIG. 4, the even parity pixels are marked with a dot, such as pixel 401. In the preferred implementation where the candidate pixel groups consist of all vertically or horizontally adjacent pairs of pixels (tiles), each tile contains exactly one pixel with even parity. Since each even parity pixel may be paired with one of four adjacent odd parity pixels, two bits of information are sufficient to indicate which of the four pixels it is paired with. Arrows 402 illustrate which of the four odd parity pixels the even parity pixels 401 are paired with. A table that associates a two-bit value with each even parity pixel in the repeating pattern of tiles 301 may be used to represent such a repeating pattern. This method of defining the pixel groups, or tiles in the preferred implementation, allows the tiling pattern 301 to be generated with very little computation.

Figure 3:
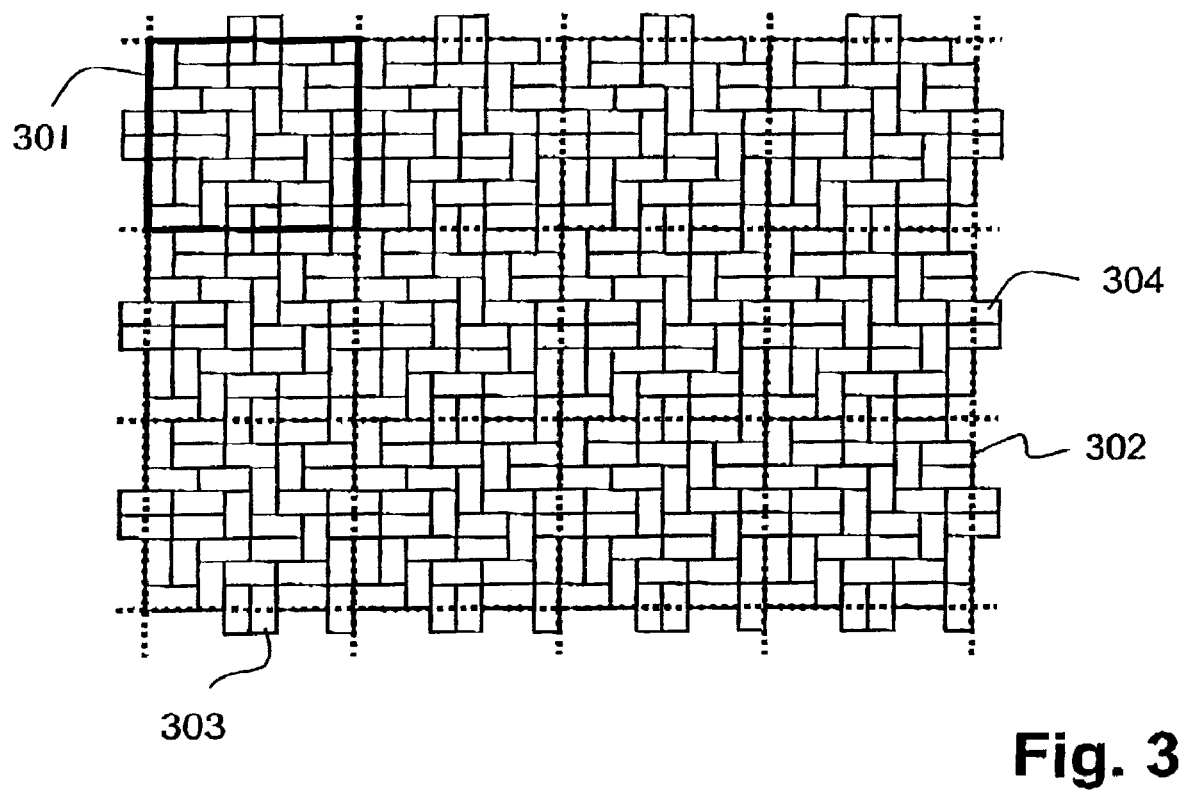
FIG. 3 illustrates an implementation for defining candidate pixel groups as a predetermined repeating random pattern of tiles.

A subset of the candidate incoherent pixel groups is next selected, with the number of selected pixel groups dependent on the amount of information to be embedded. For example, if each pixel group comprises two pixels, such as the pixel groups illustrated in FIG. 3, then at least one bit of information may be embedded by modifying the colour values of those two pixels.

In one implementation a pseudo-random process may be used to select the subset of the candidate incoherent pixel groups. Preferably the modification to a typical photographic digital image is made as imperceptible to the human eye as possible, allowing the modified image to serve as an acceptable substitute for the original digital image. Accordingly, in the preferred implementation, those pixel groups which would have the least visible impact when the colours of their pixels are modified, are selected. In order to do so and referring again to FIG. 2, method 100 determines a visibility threshold in step 120, with the visibility threshold value depending on the amount of information to be embedded and the colour values of the pixels of each pixel group.

Figure 5:
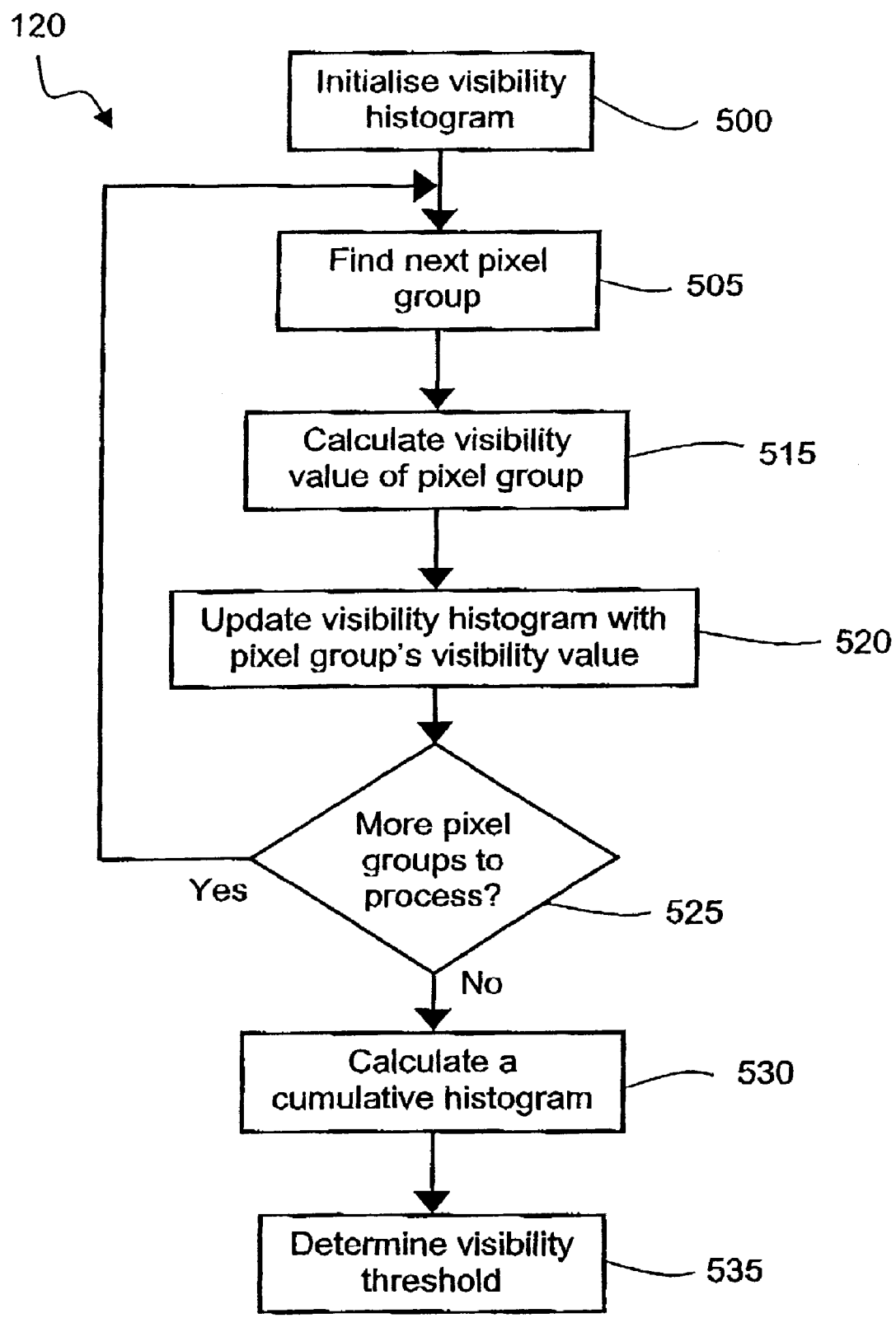
FIG. 5 shows a flow diagram of the sub-steps used for determining a visibility threshold.

FIG. 5 shows a flow diagram of the sub-steps of step 120 used for determining the visibility threshold. The sub-steps of step 120 starts in sub-step 500 where the processor 205 initialises all entries of a visibility histogram to 0. The visibility histogram consists of a table indexed by a visibility value, indicating how many pixel groups from the candidate pixel groups have a given visibility value. The visibility value is a measure of visible colour difference in the colours of the pixels in the respective pixel groups.

Step 120 then proceeds to sub-step 505 where a next pixel group is found. Sub-step 515 follows where the visibility value of the pixel group under consideration is calculated. The visibility value serves as a measure of how visible a modification of the colour values of the pixels in the pixel group would be.

After the visibility value of the pixel group under consideration is calculated in sub-step 515, sub-step 520 increments the visibility histogram entry indexed by that visibility value. Step 120 then proceeds to sub-step 525 where it is determined whether there are any more pixel groups left to be processed. If there are any pixel groups left, then step 120 returns control to sub-step 505 where the next pixel group is found.

If sub-step 525 determines that all pixel groups have been processed, then step 120 proceeds to sub-step 530 where a cumulative histogram of visibility values is calculated from the visibility histogram. The cumulative histogram tabulates the number of pixel groups with a visibility value less than or equal to any given visibility value.

Finally, in sub-step 535, the visibility threshold is determined from the cumulative histogram by finding the first value (i.e. smallest) in the cumulative histogram that represents a sufficient number of pixel groups to embed the information. For example, if each pixel group consists of two pixels then, in a specific implementation, each pixel group is used to embed one bit of information. In this implementation, the number of pixel groups required to embed the information is equal to the number of bits of information. In such a case the visibility threshold is the index of the first value in the cumulative histogram that is greater than the number of bits of information to be embedded.

Referring again to FIG. 2, the method 100 of steganographically embedding information in the digital image continues to step 125 where the required number of pixel groups are selected from the candidate incoherent pixel groups defined in step 115. The selection is based on the visibility threshold determined in step 120. While the visibility threshold provides a means for selecting a sufficient number of pixel groups to embed the information, the number of pixel groups that would be selected solely on the basis of the visibility threshold would typically not be exactly equal to the required number, but rather slightly more.

Figure 6:
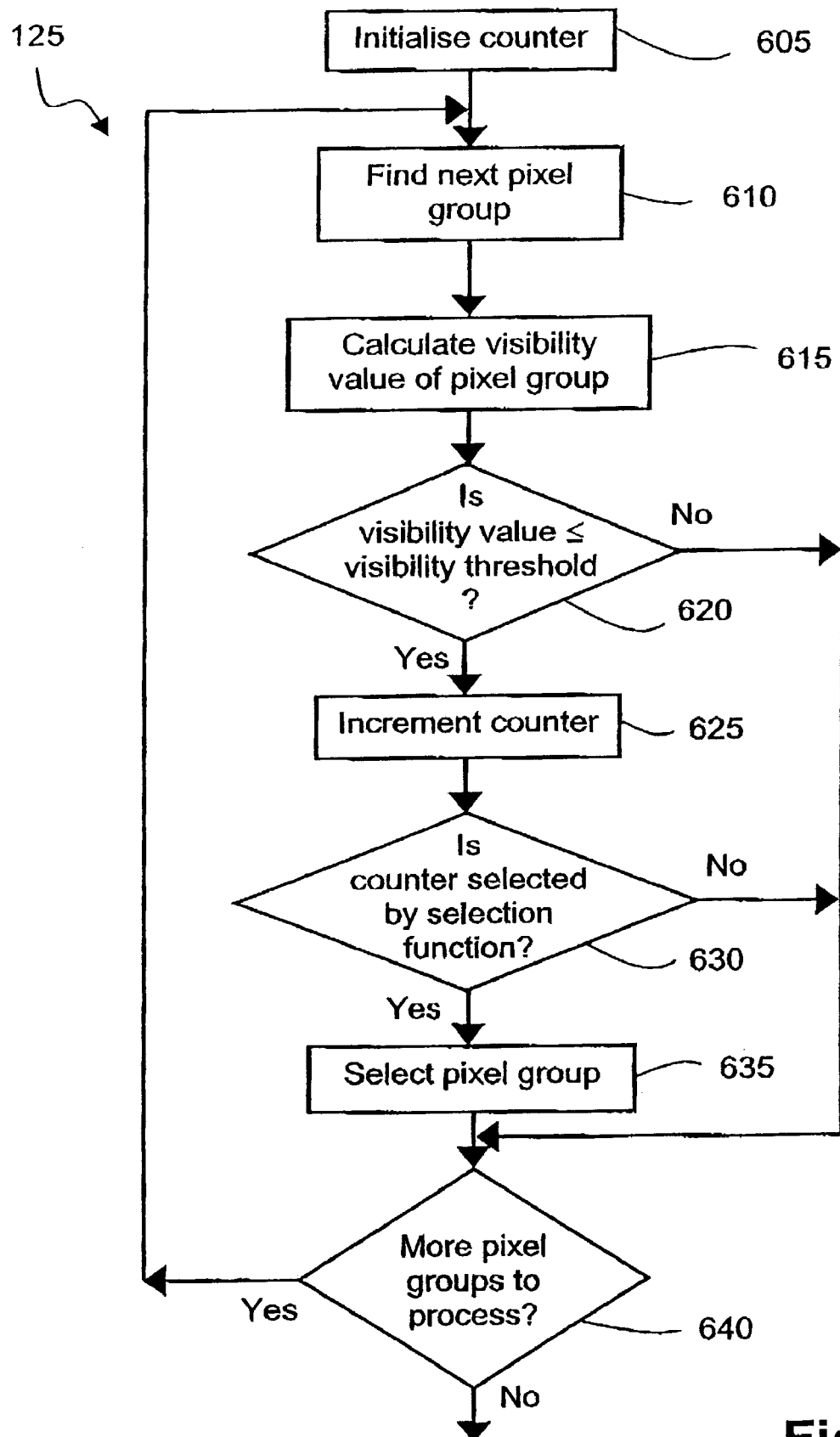
FIG. 6 illustrates the preferred sub-steps used for selecting the required number of pixel groups.

FIG. 6 illustrates the preferred sub-steps of step 125 used for selecting the required number of pixel groups, with each selected pixel group having a visibility value below the visibility threshold. Step 125 starts in sub-step 605 where a counter is initialised to 0. Sub-step 610 follows where a next pixel group is found and the visibility value of that pixel group is calculated in sub-step 615 in a manner that is the same as that used in sub-step 515 (FIG. 5). Sub-step 620 determines whether the calculated visibility value of the pixel group under consideration is smaller or equal to the visibility threshold. If the pixel group's visibility value is larger than the visibility threshold, then the pixel group is not selected, and the step 125 continues to sub-step 640 where it is determined whether there are any more pixel groups left to be processed. If there are any pixel groups left, then step 125 returns control to sub-step 610 where the next pixel group is found.

If sub-step 620 determines that the calculated visibility value of the pixel group under consideration is smaller or equal to the visibility threshold, then the counter is incremented in sub-step 625, with the counter acting as an index of the current pixel group The index of the current pixel group is tested in sub-step 630 using a selection function to determine whether the pixel group should be selected for modification.

The pixel groups chosen by the selection function in sub-step 630 are preferably spread out across the image and the positions of the chosen pixel groups ideally should not conform to any visible pattern To achieve these aims, the pixel groups are preferably randomly chosen from those that have a visibility value smaller or equal to the visibility threshold. The chosen subset of pixel groups needs to be reproducible so that the information can be recovered. It is also desirable that pixel groups can be efficiently tested for inclusion in the subset in the order that the image data is stored to make memory access efficient. In the preferred implementation this is accomplished using a selection fiction based on the index of the pixel group. The selection function used depends on the number of pixel groups with visibility below the visibility threshold and on the number of pixel groups required to embed the information.

One implementation of a suitable selection function for sub-step 630 involves using pseudo-random permutations. It is assumed that all incoherent pixel groups with visibility below the visibility threshold are assigned a unique index in the range 0, . . . , N−1 where N is the number of incoherent pixel groups with visibility below the visibility threshold calculated in step 120. N may be determined in step 120 from the cumulative histogram calculated in sub-step 530. If a pixel group has index i, then the pixel group is selected by sub-step 635 if p(i)<R where R is the required number of pixel groups to embed the information, and p is a pseudo-random permutation of the numbers 0, . . . , N−1. One example of an efficient pseudo-random permutation p is the sequence produced by a linear congenital random number generator. If sub-step 630 determines that p(i)≧R then step 125 continues to sub-step 640.

Many other schemes for selecting an effectively random subset of a predetermined size R from a larger set of size N may be used.

Sub-step 640 determines whether there are any more pixel groups left to be processed. If there are any pixel groups left, then step 125 returns control to sub-step 610 where the next pixel group is found, alternatively step 125 ends.

Referring again to FIG. 2, the method 100 of steganographically embedding information in the digital image continues to step 130 where the colour values of the pixels of the pixel groups selected in step 125 are selectively modified to embed the information. An integer colour value is assigned to each pixel in a respective pixel group from the colour value of that pixel, and part of the information is embedded in the pixel group by selectively modifying the colour values of one or more of the pixels in the pixel group so that the integer colour values of the pixels in the pixel group have a desired order, The order of the pixels may be the order that they appear in scan-line order.

An example of a scheme for assigning an integer colour value to a colour is to assign the integer colour value:

$$2^{2n}r + 2^{n}g + b \qquad (3)$$

to the colour having colour components (r, g, b) in the RGB colour space, where n is the number of bits used to represent each colour component. Many other schemes are possible. Preferably, each distinct colour is associated with a distinct integer colour value.

For example, in the case where the pixel group consists of two pixels, a '0' bit may be embedded by modifying one or more of the colour values of the pixels of that pixel group, if necessary, so that the 'first' pixel in the predetermined order has a smaller integer colour value than the 'second' pixel in the predetermined order. Similarly, a '1' bit is embedded by modifying one or more of the colour values of the pixels of that pixel group, if necessary, so that the 'first' pixel has a greater integer colour value than the 'second' pixel. A part of the information is embedded in each of the selected pixel groups in the same manner.

In the implementation illustrated in FIG. 4 where each pixel in the rectangular array may be assigned a parity based on the number of the row and column it appears in, the parity may be used as the predetermined order. A '0' bit way be embedded by modifying one or more of the colour values of the pixels of that pixel group, if necessary, so that the pixel with even parity of the pair of pixels has a smaller integer colour value than the pixel with odd parity. Similarly, a '1' bit is embedded by modifying one or more of the colour values of the pixels of that pixel group, if necessary, so that the pixel with even parity has a greater integer colour value than the pixel with odd parity.

In one implementation the colour values of the pixels of the pixel group are interchanged to have the desired order. In this implementation, the visibility value calculated in sub-step 515 (FIG. 5) is preferably based on the difference in colour between the pixels in the pixel group. For example, if the pixel colour values are represented using the RGB colour space and the colour value of each pixel is represented by colour components $(r_i, g_i, b_i)$, then the difference in colour between two pixels in a pixel group, each having colour components $(r_1, g_1, b_1)$ and $(r_2, g_2, b_2)$ respectively, is calculated as the sum of the squares of the differences between corresponding colour components in the two pixels i.e.:

$$|r_1-r_2|^2 + |g_1-g_2|^2 + |b_1-b_2|^2 \qquad (2)$$

Preferably the visibility value is calculated by applying an adjustment function to the colour difference. The adjustment function is calculated using a table lookup and linear interpolation, and is designed to produce a 10-bit result. In one implementation the adjustment function is a quick approximation of a square root function. The adjustment function serves two purposes: it adjusts the colour difference to be a better indication of the perceived difference in colour; and it limits the range of possible visibility values to a small range of integer values, so that less storage is required for the visibility histogram. An advantage of interchanging the colour values of the pixels of the pixel group with pixels that are adjacent is that the local average colour does not change, making such modification of the colour values less perceptible.

However, if two or more pixels of that pixel group have non-distinct colour values, less information can be embedded in that pixel group, as interchanging colour values that are the same contains no information. Accordingly, pixel groups containing at least two pixels having non-distinct colour values should not be selected in step 125. To implement this, and referring first to FIG. 5 where the sub-steps used for determining the visibility threshold are shown, pixel groups containing at least two pixels having non-distinct colour values should be ignored and not included in the visibility histogram. Accordingly, a sub-step 510 (not illustrated) may be inserted after sub-step 505 and before sub-step 515 for determining whether all pixels of the pixel group under consideration have distinct colour values. If all colour values are distinct, then step 120 proceeds to sub-step 515. If all colour values are not distinct, then that pixel group is ignored and step 120 continues to sub-step 525.

Referring now to FIG. 6 where the sub-steps 125 used for selecting the required number of pixel groups are shown, a sub-step 612 (not illustrated) may be inserted after sub-step 610 and before sub-step 615 for determining whether all pixels of the pixel group under consideration have distinct colour values. If all colour values are distinct, then step 125 proceeds to sub-step 615. If all colour values are not distinct, then that pixel group is ignored and step 125 continues to sub-step 640.

In another implementation, when the colour values of the pixels in the pixel group needs modification so that the integer colour values of the pixels in the pixel group has the desired order, except in the case where the colour values of the pixels are the same, the colour values of the pixels are modified to values closer to an average colour while the integer colour values of those pixels has the desired order. For example, if the respective colour values of two pixels to be modified are (58, 110, 165) and (52, 108, 170), and if Equation (3) is used to assign the integer colour values to colours, then the modified colour values may be (55, 110, 165) and (56, 108, 170) respectively, which changes the order of the integer colour values, but having a minimal visual impact on the resulting image. In the special case where the colour values of two pixels are the same, say (76, 27, 96), then only one pixel's colour values has to be changed. Preferably only one colour component of that pixel is changed. If Equation (3) is used to assign the integer colour values to colours, then a desired one of the pixels may be given the colour value (75, 27, 96) providing the correct relationship with minimum visual colour change.

Figure 7:
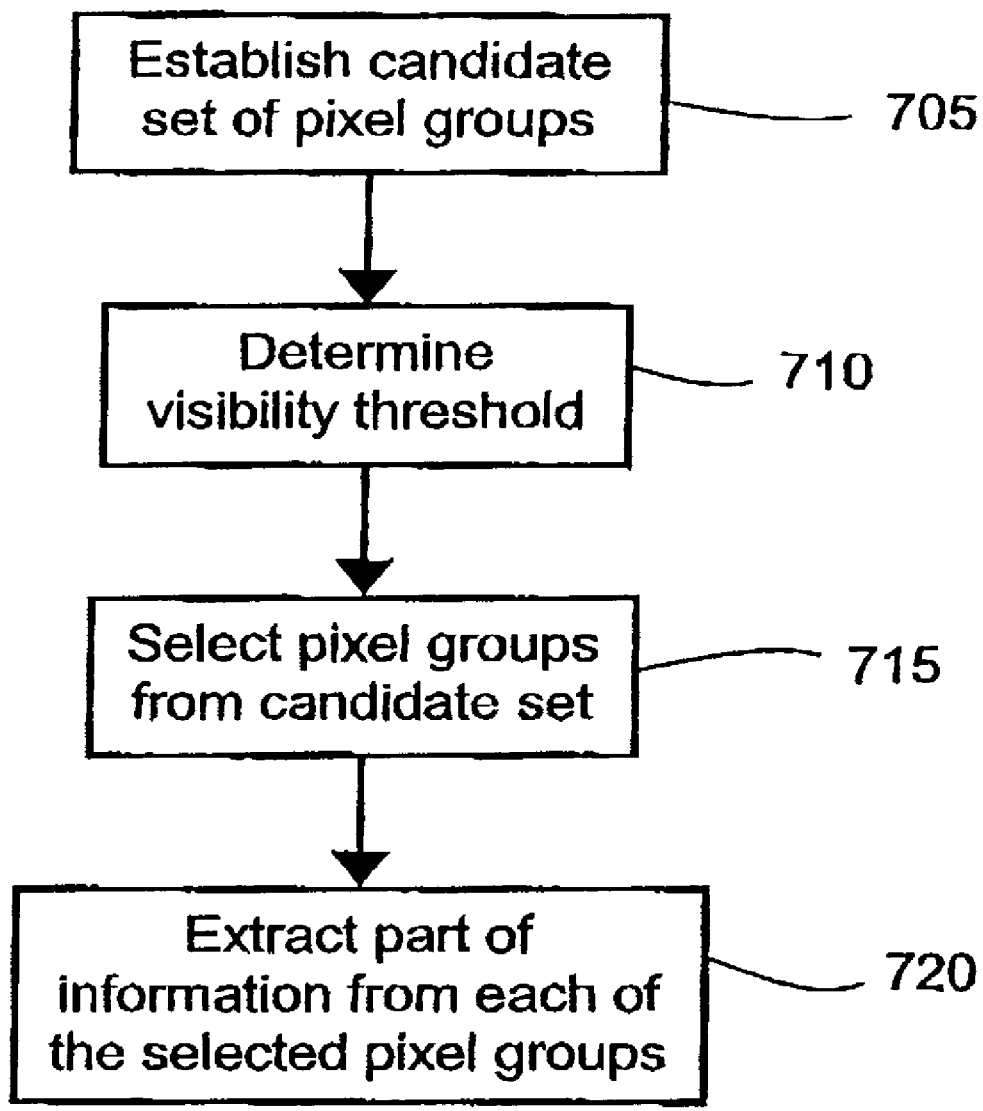
FIG. 7 shows a flow diagram of a method of extracting steganographically embedded information from the digital image.

FIG. 7 shows a flow diagram of a method 700 of extracting steganographically embedded information from the digital image, where the information was embedded using method 100 shown in FIG. 2. Method 700 starts in step 705 where the predefined candidate pixel groups are established in a manner consistent with that used in step 115 (FIG. 2). Step 710 follows where a visibility threshold is determined in a manner consistent with step 120 (FIGS. 2 and 5). Next, in step 715, a predetermined number of pixel groups are selected from the candidate pixel groups based on the visibility threshold determined in step 710 and in a manner consistent with step 125 (FIGS. 2 and 6).

Finally part of the information is extracted from each of the selected pixel groups in step 720 by comparing the order of the integer colour values assigned to the pixel colours of the pixels in each of the pixel groups.

The method of steganographically embedding information in a digital image may be used for authenticating the digital image by embedding a digital signature of the image in the image. A hash value may then be extracted and a hash value of the image may also be calculated. The extracted and calculated hash values may then be compared to verify whether the digital image is unchanged since the digital signature was embedded.

Figure 8:
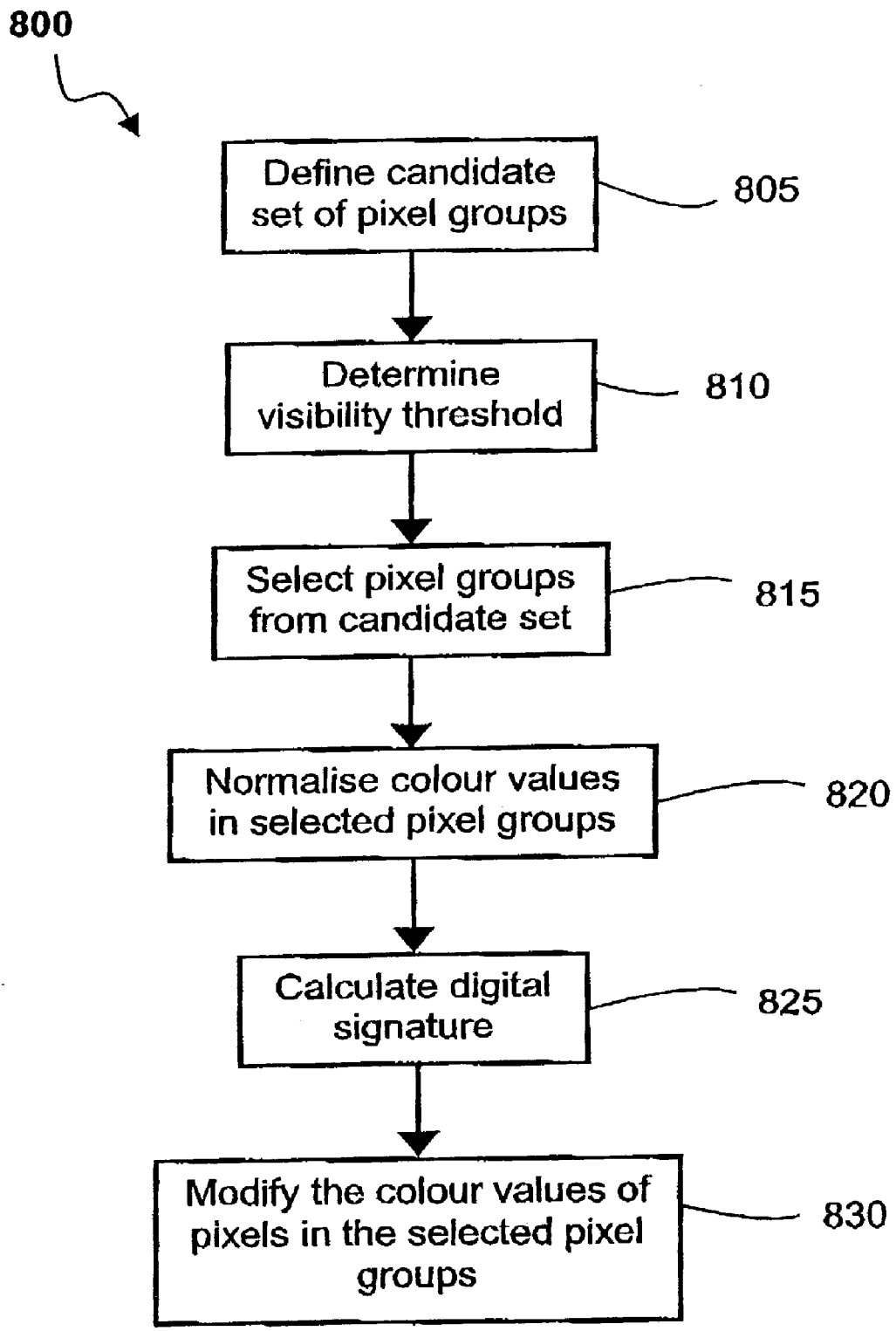
FIG. 8 shows a flow diagram of a method of steganographically embedding a digital signature in a digital image.

FIG. 8 shows a flow diagram of a method 800 of steganographically embedding a digital signature in a digital image. A difficulty exists when embedding a digital signature in a digital image, as the modification to the image resulting from the embedding of the digital signature changes the hash value of the image. This difficulty is overcome by normalising the image in a manner that enables a receiver to similarly normalise the image, thereby obtaining the same hash value for verification.

The method 800 starts in step 805 where the processor 205 defines the candidate set of incoherent pixel groups in the digital image, with each pixel group including at least two image pixels in a manner that is the same as that described in relation to step 115 (FIG. 2).

The method 800 then determines a visibility threshold in step 810 in a manner that is the same as that described in relation to step 120 (FIGS. 2 and 5), except that the sub-step 510 is always performed. The method 100 continues to step 815 where the required number of pixel groups are selected from the candidate incoherent pixel groups defined in step 805 in a manner that is the same as that described in relation to step 125 (FIGS. 2 and 6), except that the sub-step 612 is always performed.

The colour values of the selected pixel groups are next normalised in step 820 by selectively interchanging the colour values of the pixels of the selected pixel groups so that they have a predefined order. For example, the colour values of the pixels of the selected pixel groups may be interchanged, if necessary, so that the integer colour values of the pixels in the pixel group has an ascending order.

In step 825 a hash value of the digital image with the normalised pixel groups is calculated, and the hash value is encrypted with a private key to form a digital signature. Any digital signature algorithm may be used, but in the preferred implementation a Digital Signature Standard (DSS) compliant signature is used.

The digital signature is then used as the information to be embedded in step 830 in a manner that is the same as that described in relation to step 130 (FIG. 2) by selectively interchanging the colour values of the selected pixel groups.

Figure 9:
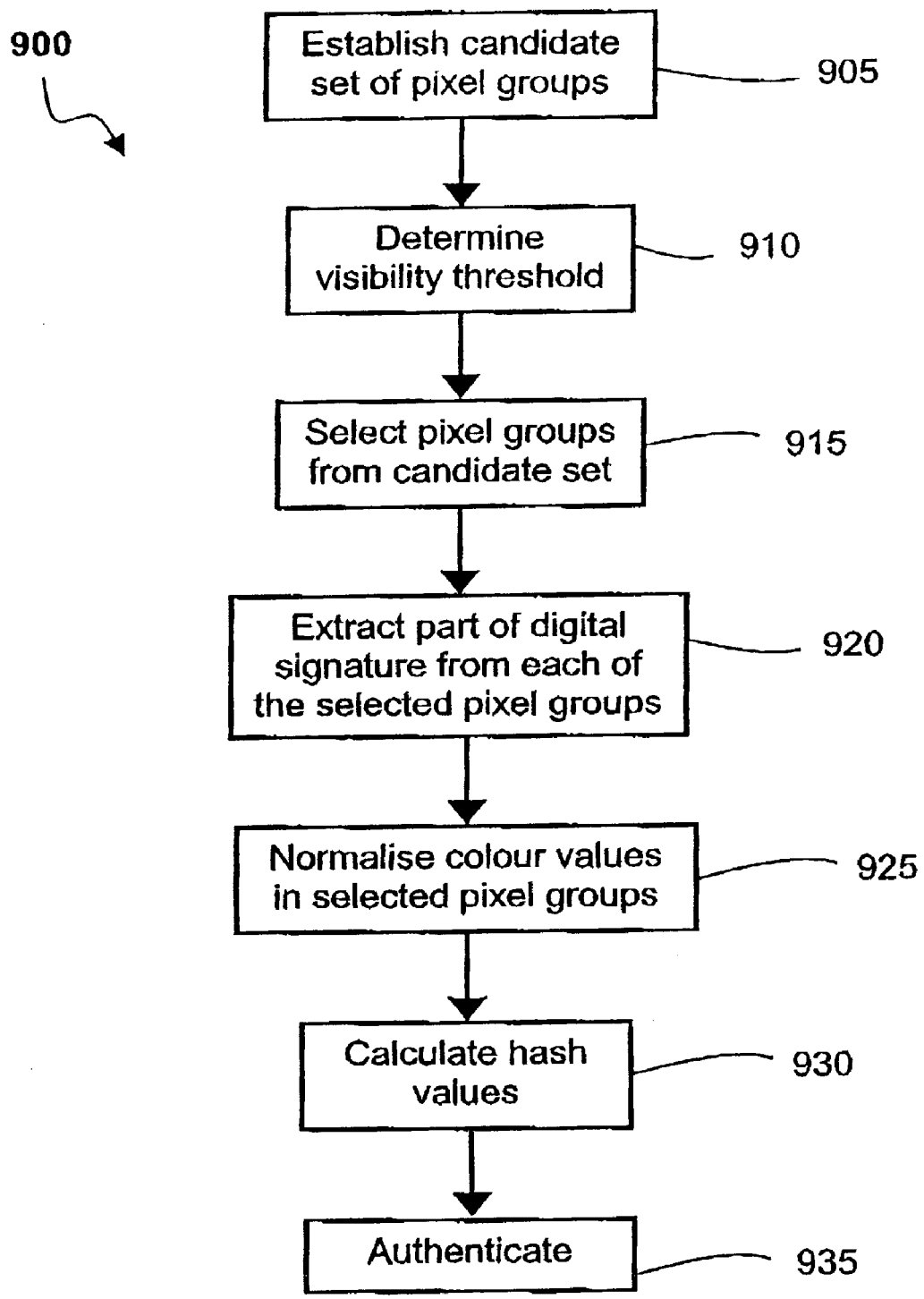
FIG. 9 shows a flow diagram of a method of authenticating a digital image having a digital signature embedded using the method of FIG. 8.

FIG. 9 shows a flow diagram of a method 900 of authenticating a digital image having a digital signature embedded using the method 800 (FIG. 8). The method 900 starts in stop 905 where the predefined candidate pixel groups are established in a manner consistent with that used in step 115 (FIG. 2). Step 910 follows where a visibility threshold is determined in a manner consistent with step 120 rigs. 2 and 5), except that the sub-step 510 is always performed. Next, in step 915, a predetermined number of pixel groups are selected from the candidate pixel groups based on the visibility threshold determined in step 910 and in a manner consistent with step 120 (FIGS. 2 and 6), except that the sub-step 612 is always performed.

Part of the embedded digital signature is extracted from each of the selected pixel groups in step 920 by comparing the order of the integer colour values assigned to the pixel colours of the pixels in each of the pixel groups. Before a hash value of the received image is calculated, the digital image is first normalised in step 925 by selectively interchanging the colour values of the pixels of the selected pixel groups so that they have the predefined order used by the digital signature embedding method 800. The hash value of the received image with the normalised pixel groups is calculated in step 930, and a decrypted hash value is obtained by applying the sender's public key to the extracted digital signature. The digital image can now be authenticated by comparing in step 935 the hash value calculated from the normalised image with the extracted hash obtained from the embedded digital signature. If the two hash values are the same, then the image is authentic, else the image has been changed since the digital signature has been embedded.

In another implementation the colour values of the selected pixel groups are normalised in steps 820 and 925, not by selectively interchanging the colour values of the pixels of the selected pixel groups so that they have a predefined order as in the previous implementation, but rather by assigning a same colour value to each of the pixels of the selected pixel groups. For example, the same colour value may be the colour value derived from performing the XOR function on the colour values of the pixels of each one of the selected pixel groups. To illustrate this example, let each pixel group comprise two pixels. For one of those pixel groups, let the colour values of the two pixels be (5, 20, 17) and (7, 21, 18) respectively in the RGB colour space. The same colour value assigned to those two pixels is then (5⊗7, 20⊗21, 17⊗18)=(2, 1, 3). It is important to note however that the colour values of the pixels of the pixel group that are modified in step 830 are the colour values before normalisation, those being (5, 20, 17) and (7, 21, 18) in the illustration. During the authentication of the digital image using method 900, and in particular during the normalisation of the colour values in step 925, the same normalisation used in step 820 (FIG. 8) is used.

The foregoing describes only some embodiments of the present invention, and modifications and/or changes can be made thereto without departing from the scope and spirit of the invention, the embodiments being illustrative and not restrictive.

The invention claimed is:

1. A method of embedding information in a digital image, said method comprising the steps of:
   a) defining a set of incoherent pixel groups in said image, each pixel group comprising at least two pixels;
   b) calculating scalar values from component values of said pixels; and
   c) embedding said information in said image by:
      determining the order of the scalar values calculated from the component values of pixels of each said pixel group; and
      selectively modifying the component values of at least one pixel of each said pixel group depending on the information to be embedded and on whether the determined order is the same as a predetermined order associated with said pixel group.

2. A method as claimed in claim 1 wherein said set of incoherent pixel groups is selected from a predefined candidate set of incoherent pixel groups using a predefined selection criterion, said predefined selection criterion selecting pixel groups comprising pixels having component values that are visually similar.

3. A method as claimed in claim 2 wherein said set of incoherent pixel groups is selected through the sub-steps of:
   determining a visibility value for each of said pixel groups, where said visibility value is a measure of visible difference in said component values of pixels in the respective pixel groups;
   determining a visibility threshold such that a predetermined number of pixel groups have visibility values smaller than or equal to said visibility threshold; and
   selecting pixel groups from said candidate set of pixel groups comprising pixels having component values that are visually more similar than said visibility threshold.

4. A method as claimed in claim 2 or 3 wherein said visual similarity of pixels is determined by calculating an Euclidean distance between colour components of said component values represented in the RGB colour space.

5. A method as claimed in claim 1, wherein pixel groups having at least two pixels with non-distinct component values are excluded from said set, and said information is embedded by selectively interchanging said component values of said pixels of said pixel groups.

6. A method as claimed in any one of claims 1 to 3 wherein each of said pixel groups comprises adjacent pixels.

7. A method of extracting information embedded in a digital image, said method comprising the steps of:
   a) defining a set of incoherent pixel groups in said image, each pixel group comprising at least two pixels;
   b) calculating scalar values from component values of said pixels; and
   c) extracting said information from said image by comparing the order of the scalar values calculated from the component values of pixels of each said pixel group with a predetermined order associated with said pixel group.

8. A method as claimed in claim 7 wherein said set of incoherent pixel groups is selected from a predefined candidate set of incoherent pixel groups using a predefined selection criterion, said predefined selection criterion selecting pixel groups comprising pixels having component values that are visually similar.

9. A method as claimed in claim 8 wherein said set of incoherent pixel groups is selected through the sub-steps of:
   determining a visibility value for each of said pixel groups, where said visibility value is a measure of visible difference in said component values of pixels in the respective pixel groups;
   determining a visibility threshold such that a predetermined number of pixel groups have visibility values smaller than or equal to said visibility threshold; and
   selecting pixel groups from said candidate set of pixel groups comprising pixels having component values that are visually more similar than said visibility threshold.

10. A method as claimed in any one of claims 7 to 9 wherein each of said pixel groups comprises adjacent pixels.

11. A method of embedding a digital signature in a digital image, said method comprising the steps of:
   a) defining a candidate set of incoherent pixel groups in said image, each pixel group comprising at least two pixels;
   b) selecting a subset of said candidate set of pixel groups using a predefined selection criterion, wherein pixel groups having at least two pixels with non-distinct component values are excluded from said selection;
   c) normalizing component values of pixels of the selected pixel groups to form a normalized image;
   d) calculating said digital signature from said normalized image;
   e) calculating scalar values from component values of said pixels; and
   f) embedding said digital signature in said image by:
      determining the order of the scalar values calculated from the component values of pixels of each said pixel group; and
      selectively interchanging component values of pixels of said selected subset of pixel groups depending on said digital signature to be embedded and on whether the determined order is the same as a predetermined order associated with said pixel group.

12. A method as claimed in claim 11 wherein, in step (b), said predefined selection criterion is used to select pixel groups comprising pixels having component values that are visually similar.

13. A method as claimed in claim 11 wherein step (b) comprises the sub-steps of:
   b1) determining a visibility value for each of said pixel groups, where said visibility value is a measure of visible difference in said component values of pixels in the respective pixel groups;
   b2) determining a visibility threshold such that a predetermined number of pixel groups have visibility values smaller than or equal to said visibility threshold; and
   b3) selecting pixel groups from said candidate set of pixel groups comprising pixels having component values that are visually more similar than said visibility threshold.

14. A method as claimed in any one of claims 11 to 13 wherein each of said pixel groups comprises adjacent pixels.

15. A method of authenticating a digital image, said method comprising the steps of:
   a) establishing a candidate set of incoherent pixel groups in said image, each pixel group comprising at least two pixels;

b) selecting a subset of said candidate set of pixel groups using a predefined selection criterion, wherein pixel groups having at least two pixels with non-distinct component values are excluded from said selection;

c) calculating scalar values from component values of said pixels;

d) extracting said digital signature from said image by comparing the order of scalar values calculated from the component values of pixels of said selected subset of pixel groups with a predetermined order associated with said pixel group;

e) calculating a first hash value from said digital signature;

f) normalizing component values of pixels of the selected pixel groups to form a normalized image;

g) calculating a second hash value from the normalized image; and h) authenticating said digital image by comparing said first and second hash values.

16. A method as claimed in claim 15 wherein, in step (b), said predefined selection criterion is used to select pixel groups comprising pixels having component values that are visually similar.

17. A method as claimed in claim 15 wherein step (b) comprises the sub-steps of:

b1) determining a visibility value for each of said pixel groups, where said visibility value is a measure of visible difference in said component values of pixels in the respective pixel groups;

b2) determining a visibility threshold such that a predetermined number of pixel groups have visibility values smaller than or equal to said visibility threshold; and b3) selecting pixel groups from said candidate set of pixel groups comprising pixels having component values that are visually more similar than said visibility threshold.

18. A method as claimed in claim 15 wherein each of said pixel groups comprises adjacent pixels.

19. A method of authenticating a digital image, said method comprising the steps of:

a) extracting an embedded digital signature from said digital image;

b) calculating a first hash value from said digital signature;

c) normalizing component values of pixels of said image to form a normalized image;

d) calculating a second hash value from the normalized image; and e) authenticating said digital image by comparing said first and second hash values.

20. An apparatus for embedding information in a digital image, said apparatus comprising:

means for defining a set of incoherent pixel groups in said image, each pixel group comprising at least two pixels;

means for calculating scalar values from component values of said pixels; and means for embedding said information in said image by:
  determining the order of the scalar values calculated from the component values of pixels of each said pixel group; and
  selectively modifying the component values of at least one pixel of each said pixel group depending on the information to be embedded and on whether the determined order is the same as a predetermined order associated with said pixel group.

21. An apparatus as claimed in claim 20, wherein said set of incoherent pixel groups is selected from a predefined candidate set of incoherent pixel groups using a predefined selection criterion, said predefined selection criterion selecting pixel groups from said candidate set of pixel groups comprising pixels having component values that are visually similar.

22. An apparatus as claimed in claim 21 wherein said means for selecting comprises:

means for determining a visibility value for each of said pixel groups, where said visibility value is a measure of visible difference in said component values of pixels in the respective pixel groups;

means for determining a visibility threshold such that a predetermined number of pixel groups have visibility values smaller than or equal to said visibility threshold; and means for selecting pixel groups from said candidate set of pixel groups comprising pixels having component values that are visually more similar than said visibility threshold.

23. An apparatus as claimed in claim 21 or 22 wherein said visual similarity of pixels is determined by calculating an Euclidean distance between colour components of said component values represented in the RGB colour space.

24. An apparatus as claimed in claim 20, wherein pixel groups having at least two pixels with non-distinct component values are excluded from said set, and said information is embedded by selectively interchanging said component values of said pixels of said pixel groups.

25. An apparatus as claimed in any one of claims 20 to 22 wherein each of said pixel groups comprises adjacent pixels.

26. An apparatus for extracting information embedded in a digital image, said apparatus comprising:

means for defining a set of incoherent pixel groups in said image, each pixel group comprising at least two pixels;

means for calculating scalar values from component values of said pixels; and means for extracting said information from said image by comparing the order of the scalar values calculated from the component values of pixels of each said pixel groups with a predetermined order associated with said pixel group.

27. An apparatus as claimed in claim 26 wherein said set of incoherent pixel groups is selected from a predefined candidate set of incoherent pixel groups using a predefined selection criterion, said predefined selection criterion selecting pixel groups comprising pixels having component values that are visually similar.

28. An apparatus as claimed in claim 27 further comprising means for selecting said set of incoherent pixel groups comprising:

means for determining a visibility value for each of said pixel groups, where said visibility value is a measure of visible difference in said component values of pixels in the respective pixel groups;

means for determining a visibility threshold such that a predetermined number of pixel groups have visibility values smaller than or equal to said visibility threshold; and means for selecting pixel groups from said candidate set of pixel groups comprising pixels having component values that are visually more similar than said visibility threshold.

29. An apparatus as claimed in any one of claims 26 to 28 wherein each of said pixel groups comprises adjacent pixels.

30. An apparatus for embedding a digital signature in a digital image, said apparatus comprising:

means for defining a candidate set of incoherent pixel groups in said image, each pixel group comprising at least two pixels;

means for selecting a subset of said candidate set of pixel groups using a predefined selection criterion, wherein pixel groups having at least two pixels with non-distinct component values are excluded from said selection;

means for normalizing component values of pixels of the selected pixel groups to form a normalized image;

means for calculating said digital signature from said normalized image;

means for calculating scalar values from component values of said pixels; and means for embedding said digital signature in said image by:
determining the order of the scalar values calculated from the component values of pixels of each said pixel group; and
selectively interchanging component values of pixels of said selected subset of pixel groups depending on said digital signature to be embedded and on whether the determined order is the same as a predetermined order associated with said pixel group.

31. An apparatus for authenticating a digital image, said apparatus comprising:
means for establishing a candidate set of incoherent pixel groups in said image, each pixel group comprising at least two pixels;
means for selecting a subset of said candidate set of pixel groups using a predefined selection criterion, wherein pixel groups having at least two pixels with non-distinct component values are excluded from said selection;
means for calculating scalar values from component values of said pixels;
means for extracting said digital signature from said image by comparing the order of scalar values calculated from the component values of pixels of said selected subset of pixel groups with a predetermined order associated with said pixel group;
means for calculating a first hash value from said digital signature;
means for normalizing component values of pixels of the selected pixel groups to form a normalized image;
means for calculating a second hash value from the normalized image; and
means for authenticating said digital image by comparing said first and second hash values.

32. An apparatus for authenticating a digital image, said apparatus comprising:
means for extracting an embedded digital signature from said digital image;
means for calculating a first hash value from said digital signature;
means for normalizing component values of pixels of said image to form a normalized image;
means for calculating a second hash value from the normalized image; and
means for authenticating said digital image by comparing said first and second hash values.

33. A program stored in a memory medium for embedding information in a digital image, said program comprising:
code for defining a set of incoherent pixel groups in said image, each pixel group comprising at least two pixels;
code for calculating scalar values from component values of said pixels; and code for embedding said information in said image by:
determining the order of the scalar values calculated from the component values of pixels of each said pixel group; and
selectively modifying the component values of at least one pixel of each said pixel group depending on the information to be embedded and on whether the determined order is the same as a predetermined order associated with said pixel group.

34. A program as claimed in claim 33 wherein said set of incoherent pixel groups is selected from a predefined candidate set of incoherent pixel groups using a predefined selection criterion, said predefined selection criterion selecting pixel groups from said candidate set of pixel groups comprising pixels having component values that are visually similar.

35. A program as claimed in claim 34 wherein said code for selecting comprises:
code for determining a visibility value for each of said pixel groups, where said visibility value is a measure of visible difference in said component values of pixels in the respective pixel groups;
code for determining a visibility threshold such that a predetermined number of pixel groups have visibility values smaller than or equal to said visibility threshold; and
code for selecting pixel groups from said candidate set of pixel groups comprising pixels having component values that are visually more similar than said visibility threshold.

36. A program as claimed in claim 34 or 35 wherein said visual similarity of pixels is determined by calculating an Euclidean distance between colour components of said component values represented in the RGB colour space.

37. A program as claimed in claims 33, wherein pixel groups having at least two pixels with non-distinct component values are excluded from said set, and said information is embedded by selectively interchanging said component values of said pixels of said pixel groups.

38. A program as claimed in any one of claims 33 to 35 wherein each of said pixel groups comprises adjacent pixels.

39. A program stored in a memory medium for extracting information embedded in a digital image, said program comprising:
code for defining a set of incoherent pixel groups in said image, each pixel group comprising at least two pixels;
code for calculating scalar values from component values of said pixels; and
code for extracting said information from said image by comparing the order of the scalar values calculated from the component values of pixels of each said pixel group is the same as a predetermined order associated with said pixel group.

40. A program as claimed in claim 39 wherein said set of incoherent pixel groups is selected from a predefined candidate set of incoherent pixel groups using a predefined selection criterion, said predefined selection criterion selecting pixel groups comprising pixels having component values that are visually similar.

41. A program as claimed in claim 40 further comprising code for selecting said set of incoherent pixel groups comprising:
code for determining a visibility value for each of said pixel groups, where said visibility value is a measure of visible difference in said component values of pixels in the respective pixel groups;

code for determining a visibility threshold such that a predetermined number of pixel groups have visibility values smaller than or equal to said visibility threshold; and code for selecting pixel groups from said candidate set of pixel groups comprising pixels having component values that are visually more similar than said visibility threshold.

42. A program as claimed in any one of claims 40 to 41 wherein each of said pixel groups comprises adjacent pixels.

43. A program stored in a memory medium for embedding a digital signature in a digital image, said program comprising:

code for defining a candidate set of incoherent pixel groups in said image, each pixel group comprising at least two pixels;

code for selecting a subset of said candidate set of pixel groups using a predefined selection criterion, wherein pixel groups having at least two pixels with non-distinct component values are excluded from said selection;

code for normalizing component values of pixels of the selected pixel groups to form a normalized image;

code for calculating said digital signature from said normalized image; and code for calculating scalar values from component values of said pixels; and code for embedding said digital signature in said image by:

determining the order of the scalar values calculated from the component values of pixels of each said pixel group; and selectively interchanging component values of pixels of said selected subset of pixel groups depending on said digital signature to be embedded and on whether the determined order is the same as a predetermined order associated with said pixel group.

44. A program stored in a memory medium for authenticating a digital image, said program comprising:

code for establishing a candidate set of incoherent pixel groups in said image, each pixel group comprising at least two pixels;

code for selecting a subset of said candidate set of pixel groups using a predefined selection criterion, wherein pixel groups having at least two pixels with non-distinct component values are excluded from said selection;

code for calculating scalar values from component values of said pixels;

code for extracting said digital signature from said image by comparing the order of scalar values calculated from the component values of pixels of said selected subset of pixel groups with a predetermined order associated with said pixel group;

code for calculating a first hash value from said digital signature;

code for normalizing component values of pixels of the selected pixel groups to form a normalized image;

code for calculating a second hash value from the normalized image; and code for authenticating said digital image by comparing said first and second hash values.

45. A program stored in a memory medium for authenticating a digital image, said program comprising:

code for extracting an embedded digital signature from said digital image;

code for calculating a first hash value from said digital signature;

code for normalizing component values of pixels of said image to form a normalized image;

code for calculating a second hash value from the normalized image; and code for authenticating said digital image by comparing said first and second hash values.

* * * * *

UNITED STATES PATENT AND TRADEMARK OFFICE
CERTIFICATE OF CORRECTION

PATENT NO.         : 7,313,248 B2
APPLICATION NO. : 10/426842
DATED              : December 25, 2007
INVENTOR(S)        : Alan Valev Tonisson It is certified that error appears in the above-identified patent and that said Letters Patent is hereby corrected as shown below:

Col. 5,   line 25, "comprising;" should read --comprising:--.

Col. 6,   line 3, "Signature" should read --signature--.

Col. 10,  line 53, "group" should read --group.--.

Col. 11,  line 1, "fic-" should read --func- --.

Col. 21,  line 9, "claims 40-41" should read --claims 39-41--.

Signed and Sealed this

Twenty-ninth Day of July, 2008

JON W. DUDAS
*Director of the United States Patent and Trademark Office*